May 18, 1943. R. HALL 2,319,543
CONTINUOUS SERVICE EXPANSION JOINT
Filed Jan. 19, 1942
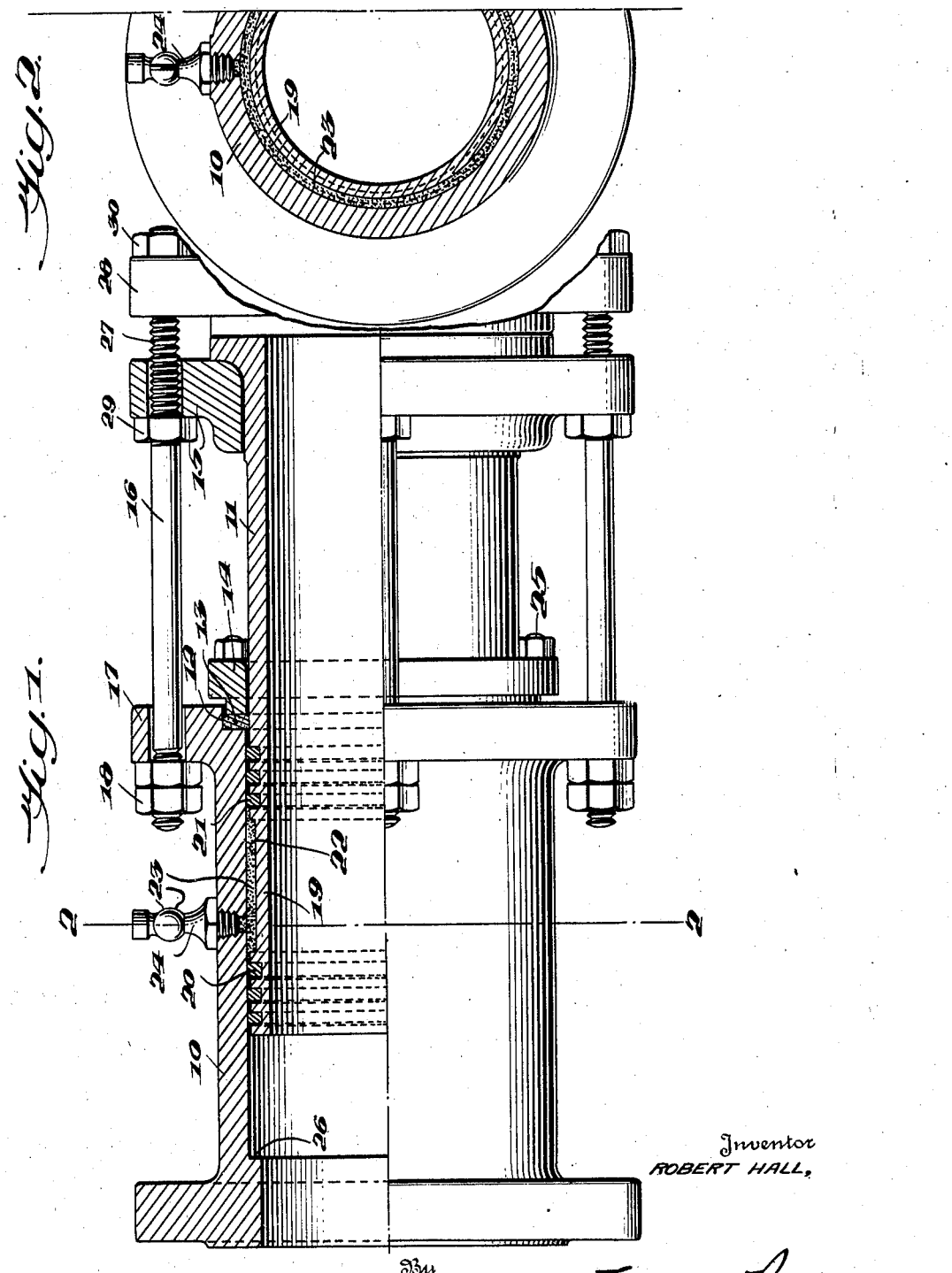
Inventor
ROBERT HALL, Patented May 18, 1943

2,319,543

UNITED STATES PATENT OFFICE 2,319,543

CONTINUOUS SERVICE EXPANSION JOINT

Robert Hall, Lockport, N. Y., assignor to American District Steam Company, North Tonawanda, N. Y., a corporation of New York Application January 19, 1942, Serial No. 427,369

4 Claims. (Cl. 285—162)

This invention relates to expansion joints suitable for use on high and low pressure pipe lines in steam or similar systems and is particularly designed for use under conditions where continuous service of lines is essential.

In the usual packed type expansion joint wherein a seal between the coacting sliding members of the expansion joint is effected through the use of a considerable quantity of fibrous packing in the form of a large number of gasket rings it is necessary to shut down the line in making replacements of the rings. According to the present invention the sealing of the coacting members of the expansion joint is effected through the combination of metal piston rings and plastic packing suitably arranged to function coactively with each other. This provides a construction which is equally well adapted to operate in low and high pressure lines, and the same requires little servicing. Where servicing is required it may be accomplished without interrupting operation of the line. A gasket ring may be employed in addition to the present sealing means as an auxiliary seal for emergency operation, but its presence is not depended upon as an essential part of the structure.

The invention may be understood by reference to the illustrative embodiment of the invention shown in the accompanying drawing wherein:

Fig. 1 is a longitudinal view partly in section and partly in elevation of an expansion joint according to the present invention; and Fig. 2 is a transverse section taken on the line 2—2 of Fig. 1.

The expansion joint shown in Figs. 1 and 2 comprises a plurality of expansion joint members telescopically arranged one within the other for longitudinal movement, the outer member being designated 10 and the inner member 11. As in the case of the usual packed type expansion joint, the bore of the outer member 10 may be enlarged adjacent its outer end to provide an annular chamber 12 adapted to receive a fibrous packing in the form of a gasket ring 13 against which the inner joint member 11 has a sliding movement. The outer end of the annular chamber 12 is closed by a flanged gland element 14 which is secured by a series of bolts 25 to flange 17 of the outer joint member 10. Whereas in the usual packed expansion joint the member 12 is of substantial length to receive a substantial number of fibrous gasket rings, the same may be comparatively short as shown in Fig. 1 to receive only a relatively small packing or gasket since the seal provided at this point is not essential to the successful operation of the novel sealing means hereafter to be described. Its presence is not entirely essential for purposes of the present invention, and is included only to provide for emergency operation in the event the plastic packing employed according to the invention has not been replenished when required.

According to the invention the inner end 19 of the inner joint member 11 is formed with grooves to receive split resilient metal piston rings, as in the case of my prior Patent No. 1,926,003, granted September 5, 1933. Whereas in such prior patent only one set of rings is employed, in the present case two sets of rings 20 and 21 are mounted in longitudinally spaced relation in grooves formed in portion 19 of the inner joint member 11. Three rings are employed in each set in the embodiment illustrated although the number of rings may be varied.

The inner surface of the outer joint member 10 is carefully machined to provide a smooth surface for coaction with the piston rings carried by portion 19 of the inner joint member 11. The two sets of rings are substantially spaced apart lengthwise so as to act as guides for the movement of the inner joint member 11 during expansion and contraction of the joint, as well as serving as sealing means for a plastic packing, now to be described.

Between the two sets of rings 20 and 21 end portion 19 of the inner joint member 11 is formed with an area of reduced diameter providing a packing chamber 22. In such chamber is received a special plastic or fluent packing consisting of asbestos fibre, graphite and high temperature oil or lubricant. Such plastic packing is indicated at 23.

At a suitable point lengthwise of the outer joint member 10 is provided a bore which will register with chamber 22 in the inner joint member in any adjusted position of the two joint parts. Threaded in such bore is a suitable valved inlet member 24 through which plastic packing may be introduced into the packing chamber by means of a suitable pressure gun. The valved inlet member is of conventional form and need not be shown or described in detail.

Chamber 22, while having relatively limited radial proportions, is, nevertheless, by reason of its length, of sufficient capacity that a charge of plastic packing initially introduced therein will, in conjunction with the piston rings, provide a reliable seal for a substantial period of time varying with service conditions. The plastic packing need be replenished only at comparatively infrequent intervals so that the maintenance costs for the joint are comparatively small.

It is found that the use of the plastic packing under pressure in conjunction with the coacting sets of piston rings disposed at the opposite ends of the packing chamber provides an extremely effective seal between the two members of the expansion joint. Such arrangement is well adapted for operation for high working steam pressures and relatively high temperatures. It will be apparent that in addition to their function of effecting a seal between the joint members the piston rings serve to minimize reduction in pressure of the plastic packing in chamber 22 by preventing escape of the plastic packing from such chamber.

An inward limit stop for the joint members may be provided by shoulder 26 formed by a portion of reduced diameter at the left end of outer joint member 10. In the innermost position of the joint members shoulder 26 will abut against end portion 19 of the inner joint member 11.

The outer portion of flange 15 of the inner joint member receives a series of tie rods 16 sliding in apertures in flange 17 of the outer joint member 10. Nuts 18 threaded on the left ends of the tie rods coact with flange 17 to provide an outward limit stop for the joint parts. Flange 15 may be threaded to anchor the right ends of the rods 16. As here shown, however, rods 16 also function as flange bolts to secure the inner joint member 11 to the adjacent section of a pipe line, thus to dispense with the necessity of separate flange bolts. For such purpose the bolt holes in flange 15 are smooth bored. Tie rods 16 are formed with an extended threaded right end portion 27 adapted to extend through flange 28 of the adjoining section of a pipe line. Nuts 29 and 30 on portion 27 of the tie rods engage flanges 15 and 28, to secure the pipe joint, and anchor the tie rods against movement so that nuts 18 thereon may function as outward limit stops for the joint. The tie rods also function as an outer guide to insure true movement of the inner joint member during expansion and contraction.

I am aware that it has heretofore been proposed to utilize piston rings in connection with expansion joints, and I am also aware that various types of joints have been proposed incorporating some form of chamber adapted to receive fluent material, such as a lubricant, under pressure. So far as I am aware, however, the present invention is the first wherein a fluent packing chamber and sets of metal piston rings disposed at the opposite ends of the chamber have been incorporated in the same member of an expansion joint to function coactively in securing a seal in operation of the joint.

I claim:

1. An expansion joint comprising an outer joint member, an inner joint member slidable therein, an annular pressure chamber formed by a portion of the inner joint member of smaller outer diameter than the inner diameter of the outer joint member and defined at its opposite ends by shoulder portions of the inner joint member of substantially the same diameter as the inner diameter of the outer joint member, plastic packing material under pressure filling said chamber in the inner joint member and making a fluid tight seal with the outer joint member, and pressure resisting sealing means secured to portions of the inner joint member beyond the opposite ends of said chamber and making fluid tight bearing engagement with the outer joint member.

2. An expansion joint comprising an outer joint member, an inner joint member substantially fitting the internal diameter of the outer joint member and telescopically slidable therein, an annular packing chamber comprising a circumferential channel formed in the outer periphery of the inner joint member, plastic packing material under pressure filling said channel and making fluid tight sealing engagement with the inner periphery of the inner joint member, and further sealing means located at the opposite ends of the plastic packing material chamber comprising resilient sealing rings seating in circumferential grooves formed in one of the joint members and making sealing engagement with the periphery of the other joint member.

3. An expansion joint comprising an outer joint member, an inner joint member of substantially the same outer diameter as the inner diameter of the outer joint member and telescopically slidable therein, a circumferential groove in the outer periphery of the inner joint member adjacent its inner end and a further circumferential groove therein substantially spaced longitudinally from the first groove, an annular packing chamber comprising a circumferential channel formed in the outer periphery of the inner joint member intermediate said grooves, plastic packing material under pressure filling said channel in the inner joint member and providing a sealing between the inner and outer joint members, inlet means in the outer joint member registering with said packing chamber for supplying plastic packing material under pressure thereto, and sealing means at the opposite ends of the plastic packing chamber comprising pressure resisting spring metal sealing rings seating in the respective grooves in the inner joint member and making bearing engagement with the outer joint member.

4. In an expansion joint comprising an outer joint member and an inner joint member telescopically slidable therein having longitudinally spaced portions of substantially the same outer diameter as the inner diameter of the outer joint member, stop means for limiting the relative longitudinal movement of the inner and outer joint members in both directions, an annular pressure chamber for plastic packing material formed by an intermediate portion of reduced diameter of the inner joint member and bounded at its opposite ends by shoulders formed by said longitudinally spaced portions of the inner joint member, and inlet means in the outer joint member for supplying plastic packing material under pressure to said chamber, said packing chamber in the inner joint member being of such length as to register with said inlet means in the outer joint member at any position of relative longitudinal movement of the inner and outer joint members within the limits of the stop means.

ROBERT HALL.